United States Patent [19]

Byers et al.

[11] Patent Number: 5,404,504
[45] Date of Patent: Apr. 4, 1995

[54] TRACE TOOL FOR SERIAL, OPTICAL INTERFACE

[75] Inventors: Daniel J. Byers; Donald E. Denning, both of Tucson, Ariz.

[73] Assignee: International Business Machines Corporation, Armonk, N.Y.

[21] Appl. No.: 55,886

[22] Filed: May 4, 1993

[51] Int. Cl.⁶ .......................................... G06F 11/00
[52] U.S. Cl. ............................... 395/575; 364/240.6; 364/367.8
[58] Field of Search .................. 395/575, 325; 364/240.1, 240.6, 260.4, 265.1, 265.5, 267, 267.8

[56] References Cited

U.S. PATENT DOCUMENTS

| | | | |
|---|---|---|---|
| 4,301,513 | 11/1981 | Hage et al. | 364/900 |
| 4,364,036 | 12/1982 | Shimizu | 340/715 |
| 4,434,488 | 2/1984 | Palmguist et al. | 371/15 |
| 4,480,317 | 10/1984 | Hage et al. | 364/900 |
| 4,495,599 | 1/1985 | Hage et al. | 364/900 |
| 4,641,348 | 2/1987 | Neuder et al. | 382/1 |
| 4,697,138 | 9/1987 | Morishita et al. | 324/73 R |
| 4,777,616 | 10/1988 | Moore et al. | 364/900 |
| 4,972,138 | 11/1990 | Bush | 324/73.1 |
| 5,182,554 | 1/1993 | Kaiser et al. | 340/826 |

OTHER PUBLICATIONS

*IBM Dictionary of Computing*, McGraw-Hill, ©1994 by IBM pp. 239 & 301.

*Primary Examiner*—Vincent P. Canney
*Attorney, Agent, or Firm*—D. A. Shifrin

[57] ABSTRACT

A system is provided for monitoring signals transmitted over one or more optical serial interface channels in an ESCON environment. A formatter card mounts on bus connector in a general purpose tracing tool (GPT) and intercepts optical I/O signals being transmitted between a host processor and, a peripheral device. The signals are decoded into trace data words which are then partitioned into ESCON transaction frames and mapped into a block of GPT frames. The GPT block is stored on the formatter card and transmitted to the GPT when the GPT can accept the data. Data received by the GPT is interleaved with data from other formatter cards attached to other I/O channels (both ESCON and non-ESCON) and is displayed or printed in time-correlated format for analysis. Data can also be stored for later review.

11 Claims, 8 Drawing Sheets

| FT NO | DST DV | SRC CMD | SDF ST | CNTL | START TIME | CNTL 0 1 | IFI 2 3 | ADDR 4 5 | FLG 6 7 | DATA 8 9 | A B | C D | E F | CNT | EOF SEQ | REF LINE NO. |
|---|---|---|---|---|---|---|---|---|---|---|---|---|---|---|---|---|
| 03 | 0D00 | 0100 | C | CMD D | 0.024291 | 00 11 | 0001 | 08 | 0002 | 0800 | BF5B | | | | | 1 |
| 03 | 0D00 | 0100 | | STA I | 0.024331 | 00 02 | 0000 | 00 | 0050 | 0000 | A4F5 | | | | | 2 |
| 03 | 0D00 | 0100 | | SAC D | 0.024345 | 00 03 | 0000 | 00 | A000 | 0000 | E68C | | | | | 3 |
| 03 | 0D00 | 0100 | | ACK I | 0.024376 | 00 03 | 0000 | 40 | B000 | 0000 | 4657 | | | | | 4 |
| 03 | 0D00 | 0100 | C | RQC I | 0.024624 | 00 03 | 0000 | 00 | 6000 | 0000 | 1C6E | | | | DSC | 5 |
| 03 | 0D00 | 0100 | | MUL D | 0.024635 | 00 03 | 0000 | 20 | 0000 | 0000 | 4A4E | | | | | 6 |
| 03 | 0D00 | 0100 | | STA I | 0.024684 | 00 02 | 0000 | 00 | 0020 | 0000 | 7C75 | | | | | 7 |
| 03 | 0D00 | 0100 | | SAC D | 0.024695 | 00 03 | 0000 | 00 | A000 | 0000 | E68C | | | | | 8 |
| 03 | 0D00 | 0100 | | ACK I | 0.024726 | 00 03 | 0000 | 40 | B000 | 0000 | 4657 | | | | | 9 |
| 03 | 0D00 | 0100 | C | CMD D | 0.024828 | 00 11 | 0001 | 08 | 0002 | 0800 | BF5B | | | | DSC | 10 |
| 03 | 0D00 | 0100 | | CMR I | 0.024951 | 00 13 | 0001 | 00 | 1407 | 0000 | E395 | | | | | 11 |
| 03 | 0D00 | 0100 | | MUL D | 0.024972 | 00 13 | 0001 | 20 | 0000 | 0000 | 1911 | | | | | 12 |
| 03 | 0D00 | 0100 | | DAT I | 0.025705 | 00 10 | 0001 | 20 | 0000 | 0003 | 0000 | 0B86 | D7F6 | | | 13 |
| 61 | D1 | 00 04 | | | 0.026062 | | | | | | | | | 0000 | 20 | 14 |
| 61 | D1 | 31 0C | | | 0.026083 | 0004 | 0001 | 2F | | | | | | 0005 | 60 | 15 |
| 61 | D1 | 31 4C | | | 0.026083 | 0004 | 0001 | 2F | | | | | | 0005 | 60 | 16 |
| 61 | D1 | 0D 0C | | | 0.026807 | 0004 | 0001 | 2FF0 | F1C4 | F100 | 0000 | 0004 | 04F9 | 00EC | 40 | 17 |
| | | | | | | F1F3 | F2F3 | 035D | 7E6E | F0A0 | 2FC1 | F0A0 | 2FC1 | | | |
| 61 | D1 | 07 0C | | | 0.028103 | 0000 | 0004 | 0001 | | | | | | 0006 | 60 | 18 |
| 61 | D1 | 1F 0C | | | 0.028341 | C0 | | | | | | | | 0001 | 60 | 19 |
| 61 | D1 | 23 08 | | | 0.028421 | CC | | | | | | | | 0001 | 60 | 20 |
| 03 | 0D00 | 0100 | | STA I | 0.034032 | 00 12 | 0001 | 00 | 010C | 899C | 3D95 | | | | | 21 |
| 03 | 0D00 | 0100 | | SAC D | 0.034058 | 00 13 | 0001 | 00 | A000 | 0000 | B5D3 | | | | | 22 |
| 03 | 0D00 | 0100 | | ACK I | 0.034088 | 00 13 | 0001 | 40 | B000 | 0000 | 1508 | | | | | 23 |
| 03 | 0D00 | 0100 | C | CMD D | 0.037028 | 00 11 | 0001 | 08 | 0002 | 0800 | BF5B | | | | DSC | 24 |
| 13 | 0D00 | 0100 | | CMR I | 0.037150 | 00 13 | 0001 | 00 | 1407 | 0000 | E395 | | | | | 25 |
| 13 | 0D00 | 0100 | | MUL D | 0.037171 | 00 13 | 0001 | 20 | 0000 | 0000 | 1911 | | | | | 26 |
| 13 | 0D00 | 0100 | | DATA I | 0.037909 | 00 10 | 0001 | 20 | 0000 | 0003 | 0000 | 0B87 | D7F6 | F1C1 | | 27 |
| 13 | 0D00 | 0100 | | STA I | 0.043326 | 00 12 | 0001 | 00 | 010C | 56E4 | 01B6 | | | | | 28 |
| 13 | 0D00 | 0100 | | SAC D | 0.433420 | 00 13 | 0001 | 00 | A000 | 0000 | B5D3 | | | | | 29 |
| 13 | 0D00 | 0100 | | ACK I | 0.043372 | 00 13 | 0001 | 40 | B000 | 0000 | 1508 | | | | DSC | 30 |

TRACE TOOL FOR SERIAL, OPTICAL INTERFACE

TECHNICAL FIELD OF THE INVENTION

The present invention relates to monitoring interface signals in a computer system, and in particular, to monitoring multiple, optical interface signals.

BACKGROUND OF THE INVENTION

Central processing units (host processors) transfer data to/from and control the operation of peripheral devices, such as direct access storage devices (DASD) and printers (collectively referred to as input/output or I/O devices), with signals transmitted over I/O channels. For many years, I/O channels employed with large computer systems have been based upon parallel channel architecture and have used copper wire.

To meet the demands for higher performance and to overcome certain limitations of conventional parallel architecture, IBM Corporation introduced Enterprise Systems Connection Architecture, also referred to as "ESCON", (both trademarks of IBM Corporation). I/O devices in an ESCON environment are interconnected with the host with fiber optic cables carrying serial control and data signals. Advantages of such a system include, among others: higher transmission rates, more flexibility in the physical location of I/O devices relative to the host (up to nine kilometers, or more, in contrast to about 400 feet in typical copper wire, parallel architectures), lighter and less bulky cables, and more centralized and flexible systems management of I/O configurations.

Information (representing both data and control) is transmitted on an ESCON channel as a series of transactions or frames. Each transaction includes at least a destination address, a command and data. More detailed information pertaining to ESCON architecture can be found in "Role of the DASD Storage Control in an Enterprise Systems Connection Environment" by Grossman (IBM Systems Journal, Vol. 31, No. 1, 1992, pp 123–146).

A large computer system may typically include multiple (if not many) I/O interfaces and ensuring correct I/O interface performance requires a complete understanding of all I/O activity, whether the system is in a non-ESCON parallel environment or in an ESCON environment. Such an understanding can only be obtained by tracing or monitoring all of the attached I/O channels. While a logic analyzer can be used to monitor discrete signal states on a single channel or, perhaps, a few channels, a logic analyzer typically does not translate the signal states into easily understandable, higher level information and also does not chronologically interleave signals from different channels for display in a time-correlated format.

One device developed, called a general purpose tracer (GPT) tool interconnects between a host and attached I/O devices to transparently monitor up to eight parallel I/O channels. The GPT interleaves up to eight traces on a single display (a computer screen or printer) and can also store trace results in internal memory and/or on an external storage device, such as a tape cartridge. Tracing and displaying all interface activity with a single tool reduces diagnostic time compared with tracing each interface with a separate instrument (such as logic analyzer) and then time-correlating the activity of the various channels. Moreover, the GPT is particularly useful in diagnosing problems involving I/O activity which switches between different interfaces. However, the GPT has only been able to process 8-bit parallel electrical signals and has not heretofore accommodated serial optical signals.

OBJECTS AND SUMMARY OF THE INVENTION

In view of the foregoing, it is an object of the present invention to provide an apparatus and method for monitoring optical serial I/O channels.

It is another object of the present invention to provide an apparatus and method for simultaneously monitoring multiple ESCON I/O channels and displaying time-correlated information.

It is still another object of the present invention to provide an apparatus and method for simultaneously monitoring multiple ESCON I/O channels and displaying time-correlated information with a GPT tool.

The present invention provides an apparatus and method for monitoring one or more ESCON and non-ESCON interface channels and for presenting a time-correlated display or printout for analysis. The apparatus comprises an ESCON formatter card which, preferably, is installed in a general purpose trace (GPT) tool and serves as an interface between an ESCON channel and the GPT. In one configuration, up to four ESCON formatter cards and up to four non-ESCON formatter cards can be employed in a GPT.

The ESCON formatter card of the present invention transparently intercepts both inbound and outbound serial, optical ESCON I/O signals being transmitting between a host processor and a peripheral device. The card comprises an input module for converting the ESCON signals into corresponding parallel electrical signals, a processing module for decoding the parallel signals into trace data words, a plurality of which represent an ESCON frame or transaction, and an output module for mapping trace data words into a GPT frame block and outputting the block to the GPT. Control and arbitration logic modules transmit and receive control signals to and from the GPT.

ESCON and non-ESCON formatter cards installed in the GPT can simultaneously monitor multiple I/O channels and transmit information pertaining to the signals to the GPT. The GPT interleaves all of the information for time-correlated display, printout and/or storage.

The foregoing and other features and advantages of the invention will be apparent from the following more particular description of preferred embodiments of the invention, as illustrated in the accompanying drawings.

BRIEF DESCRIPTION OF THE DRAWINGS

FIG. 2 is an exemplary printout of a GPT trace data display, including data processed by the formatter card of the present invention;

DETAILED DESCRIPTION OF THE INVENTION

Figure 1:
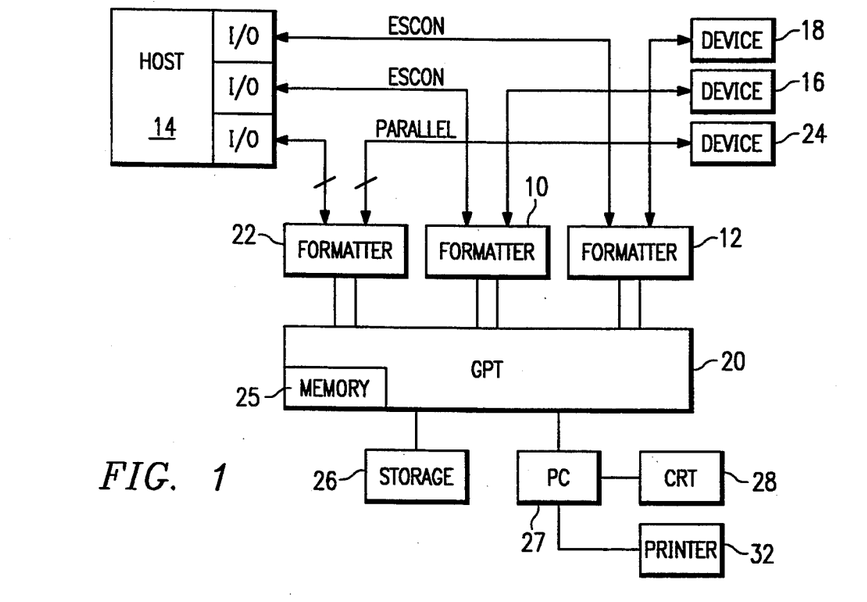
FIG. 1 is a block diagram Of the interconnection of the present invention with a computer system having both parallel and ESCON I/O channels.

FIG. 1 is a block diagram illustrating two ESCON formatter cards 10 and 12 of the present invention interconnected, via ESCON I/O channels, between a host computer system 14, two peripheral devices 16 and 18. Data outputs of the cards 10 and 12 are interconnected with a general purpose trace tool (GPT) 20. A third formatter card 22 is also interconnected, via a parallel I/O channel, with the host 14, the GPT 20 and a third peripheral device 24. The two ESCON channels are fiber optic cables carrying serial signals on light beams; the parallel channel is a conventional copper wire, parallel configuration. The GPT 20 includes internal memory 25 along with one or more of an external storage device (such as a tape drive) 26, and is connected to a computer, such as a personal computer 27, with a video display device 28 and/or a printer 32. Each formatter card 10, 12 and 22 preferably plugs into a slot in the GPT 20, thereby resulting in a self-contained unit which can be easily transported between sites requiring diagnostics. Also preferably, the GPT 20 can accommodate up to four ESCON formatter cards and as many as four parallel formatter cards, thereby increasing the ability of the GPT to monitor multiple channels of both ESCON and non-ESCON configuration.

As will be described in more detail, the ESCON formatter card 10 (as well as the card 12, although only the card 10 will be specifically referenced herein) includes connectors which accept inbound and outbound fiber optic cables from the host 14 and inbound and outbound fiber optic cables from the peripheral device 16. In order for transmission of signals to be completed between the host 14 and the device 16 without being affected by the presence of the card 10, the card 10 also includes a retimer module which retransmits light signals in the appropriate direction (to or from the host 14). The card 10 further includes converters to convert inbound and outbound light signals into 10-bit/word electrical signals which are then converted into 10-bit parallel signals, decoded and converted into a 44-bit word format. The decoded words are mapped into a 64-bit GPT frame format and placed in temporary storage on the formatter card 10. When a complete set of decoded words representing one ESCON frame, or unit of information, has been mapped and stored, an attempt is made to send them as a block to the GPT 20 itself. If the GPT 20 cannot accept the block, the block remains in the temporary storage and is downloaded to the GPT 20 at a later time. Additional data from the same or a different channel can also be received by the same or different formatter card, stored, processed and transmitted to the GPT 20. After being accepted by the GPT 20, the ESCON and non-ESCON trace data are displayed, stored, or both, and analyzed.

FIG. 2 is an exemplary printout of GPT trace data and illustrates the manner in which GPT frames of channel interface information, each frame occupying a row, from multiple sources are interleaved and time-correlated. ESCON frame sizes and contents vary, depending upon the type and intent of each transfer operation. Moreover, there are two types of operations: link level transfers, which contain housekeeping data controlling the physical aspects of an ESCON configuration, and device level, which contain actual data to be transferred and device commands.

Referring to FIG. 2, each channel interconnected with the host 14 has an interface number which is displayed as the first digit in the first (leftmost) column of the printout. The second digit in the first column indicates the interface type, a '1' representing a conventional System/370 interface and a '3' representing an ESCON interface. There is great flexibility in an ESCON environment with respect to data connections or paths among devices, controllers and processors. Therefore each ESCON frame includes information defining a channel to a device, including a port address on an ESCON director, the unit number of any logical control unit involved and the device address within the control unit. This information is represented by the destination and source addresses in the next columns of each row (frame). Following certain control information (such as whether the data is inbound or outbound relative to the host), the start time of each frame is indicated, followed by actual data. The reference line numbers in the last column represent ESCON frame numbers.

Figure 3:
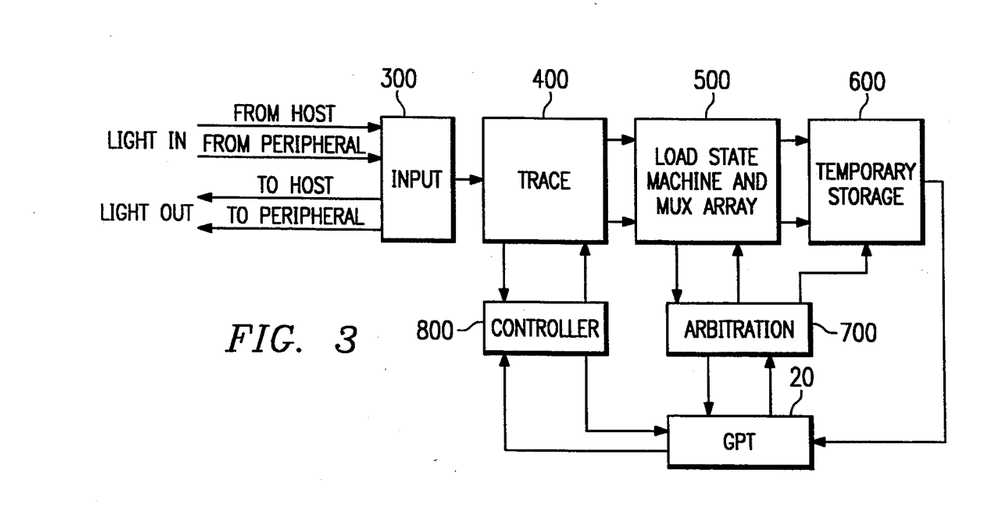
FIG. 3 is a block diagram of one embodiment of a formatter card of the present invention.

FIG. 3 is a block diagram of one embodiment of the ESCON formatter card 10 of FIG. 1. The card 10 includes an input module 300, a trace module 400, a load state machine (such as an erasable programmable logic device) and array multiplexers (MUX's) 500, temporary memory storage 600, arbitration logic 700 and a control module 800. The control module 800 is interconnected with the GPT 20 and, via GPT software, directs the operation of the trace module 400. The arbitration logic 700 is interconnected with control lines of the load state machine and MUX array 500 which indicates when a complete GPT block (ESCON frame) is ready to be transmitted. The arbitration logic 700 is also interconnected with control lines of the GPT 20 to transmit a signal to the GPT 20 when a block is ready and to receive a signal from the GPT 20 when the GPT 20 is ready to accept the block. Upon receipt of the signal from the GPT 20, the arbitration logic 700 directs the temporary storage 600 to transfer the block to the GPT 20.

Figure 4:
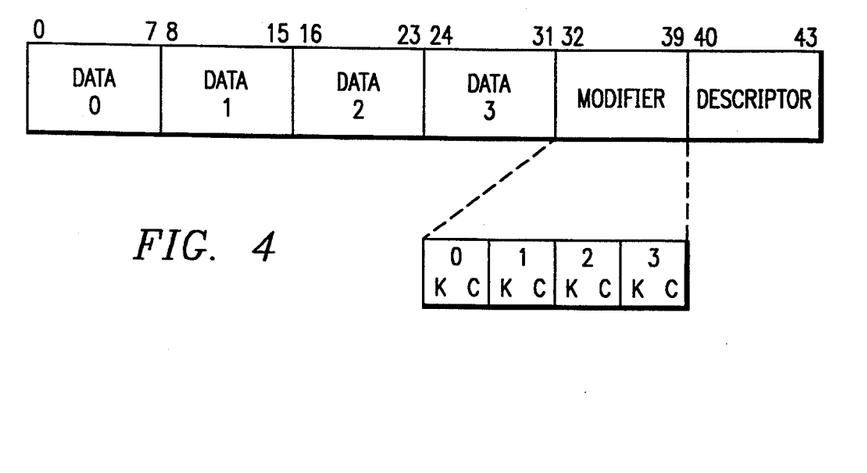
FIG. 4 illustrates the format of trace module output data.

FIG. 4 illustrates the format of the output of the trace module 400 after serial ESCON signals have been converted into 10-bit/word parallel electrical signals by the input module 300 and decoded by the trace module 400. The trace module output is a 44-bit trace data word having four data bytes, a fifth "modifier" byte and four frame-descriptor bits used in conjunction with placing the trace data word into temporary storage 600. The modifier byte contains four pairs of K-code and code violation ("C") bits, each pair associated with one data byte in the trace data word. The K-bit indicates whether the associated data byte is control information; the C-bit indicates whether associated data byte is valid. The descriptor bits define the beginning and end of an ESCON frame.

Figure 5:
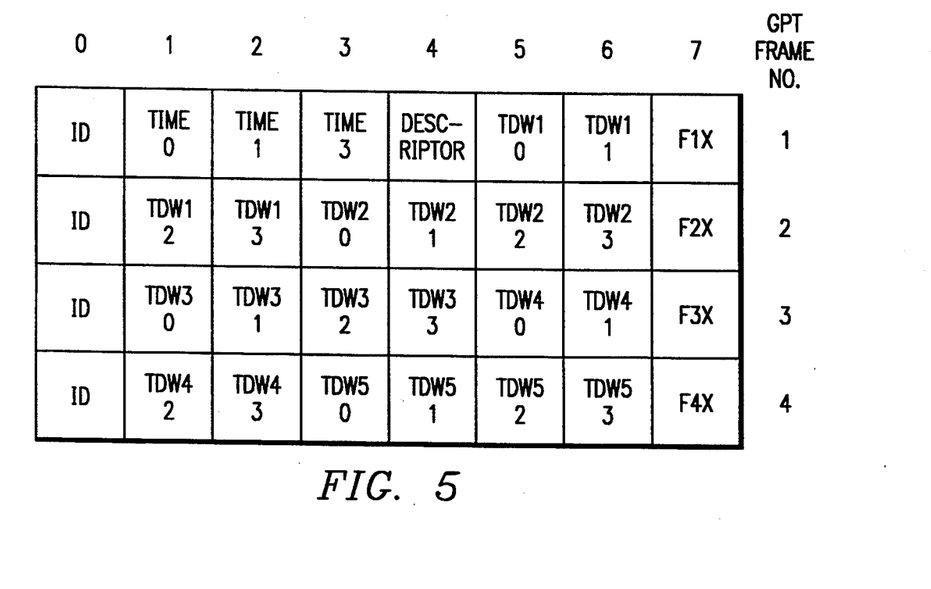
FIG. 5 illustrates the format of a GPT frame block into which trace module output words, representing an ESCON frame, have been mapped.

The process of mapping trace data words of an ESCON frame into a GPT frame block will now be described with reference to FIG. 5. Each of the four rows in the block represents a GPT frame and is divided into eight bytes. The 32-bytes shown in FIG. 5 constitutes an ESCON frame mapped into a GPT frame block. The first byte (identified as byte 0) of each GPT frame is an identification byte and includes a bit to indicate whether a frame is a first frame block or a continuation of a previous block. The first byte also includes bits to identify the type of formatter card (ESCON or non-ESCON) and its card number. The second through fourth bytes (bytes 1-3) of the first GPT frame contain a time stamp indicating the time the ESCON frame was received by the formatter card 10. Byte 4 of the first GPT frame is a descriptor byte defining the direction of travel of the frame (inbound or outbound) and identifying any padding bytes in the previous frame. The eighth byte (byte 7) of each GPT frame is an "X-byte" containing the K-bits from the modifier byte of the associated trace module output word and a code violation bit which indicates whether any of the code violation bits in the modifier byte are set. For example, the first five bits of the X-byte F1X of the first GPT frame would contain zeros (because the first five bytes of the GPT frame do not contain data bytes from a trace data word), the next two bits, associated with bytes five and six of the GPT frame (corresponding to the first two data bytes of the trace data word) contain the first two K-bits from the modifier byte of the trace data word, and the seventh bit is not used.

The four data bytes of each trace data word are inserted into the remaining available bytes of the GPT frames; that is, bytes 5 and 6 of the first frame and bytes 1 through 6 of each successive GPT frame. Consequently, the first two data bytes of the first trace data word are inserted into bytes 5 and 6 of the first GPT frame while the remaining two data bytes of the first trace data word are inserted into bytes 1 and 2 of the second GPT frame. The four data bytes of the second trace data word fill bytes 3 through 6 of the second GPT frame and the four data bytes of the third trace data word fill bytes 1 through 4 of the third GPT frame. This pattern is repeated until all of the trace data words have been mapped into GPT frames. In the example illustrated in FIG. 5, the data bytes of a fourth trace data word are divided between the third and fourth GPT frames and the four data bytes of a fifth trace data word are inserted entirely into the fourth GPT frame, completing the GPT block. ESCON frames vary in size and may require more than one block per frame. Because block size is fixed, empty bytes at the end of a block are padded with zeros.

Figure 6A:
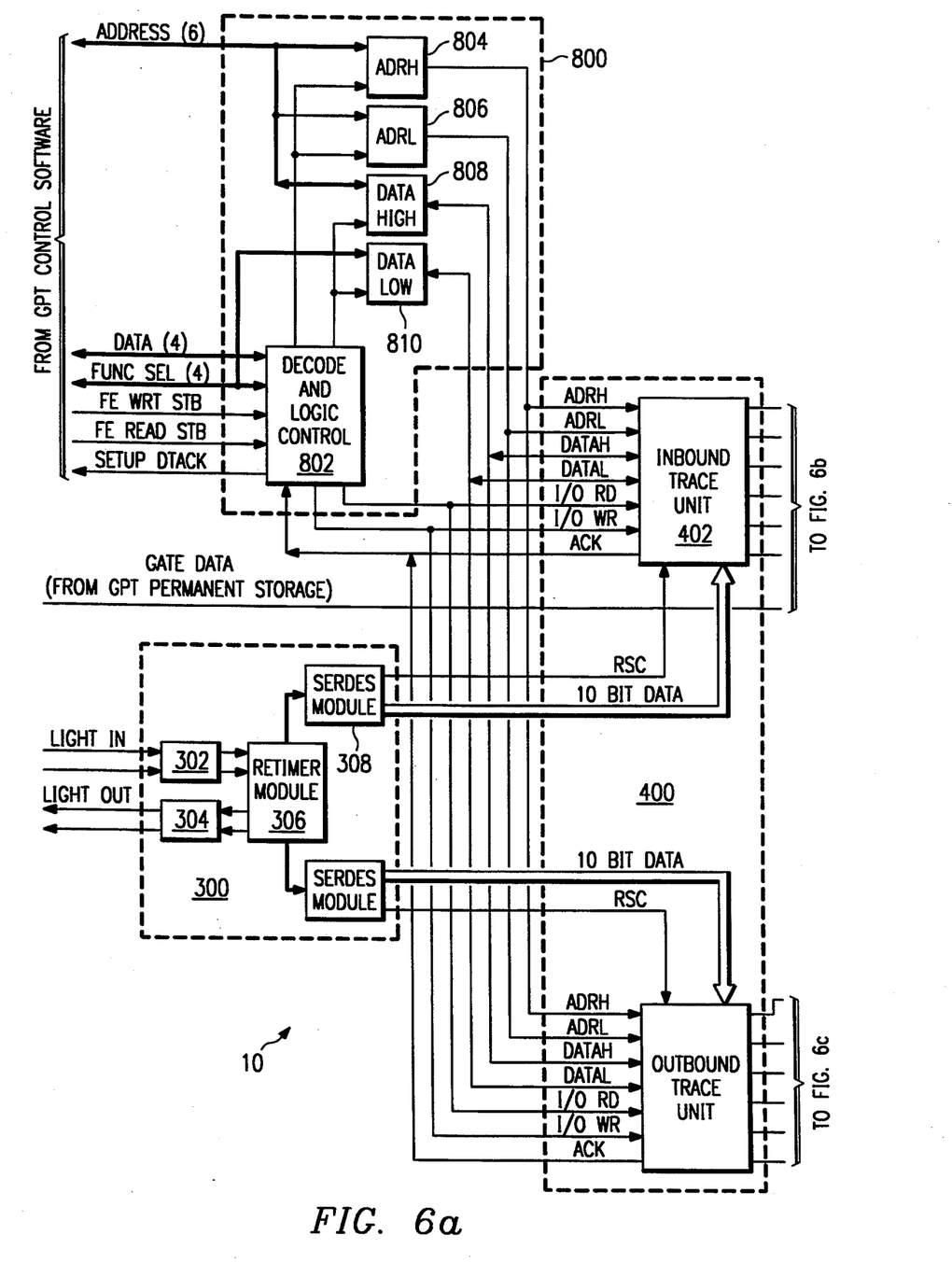
FIG. 6A-6C (collectively referred to herein as FIG. 6) from a detailed block diagram of the formatter card of the present invention.
Figure 6B:
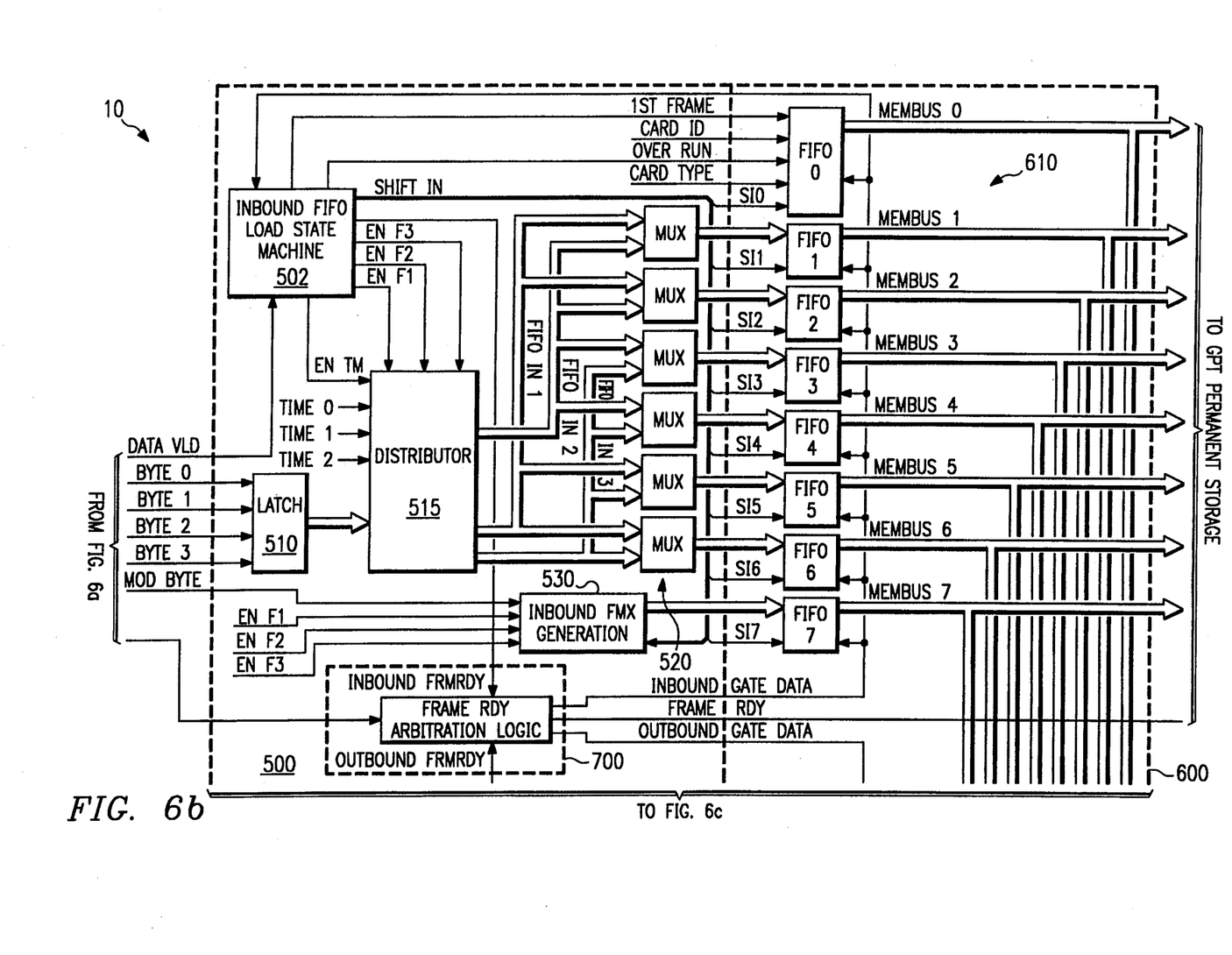
Figure 6C:
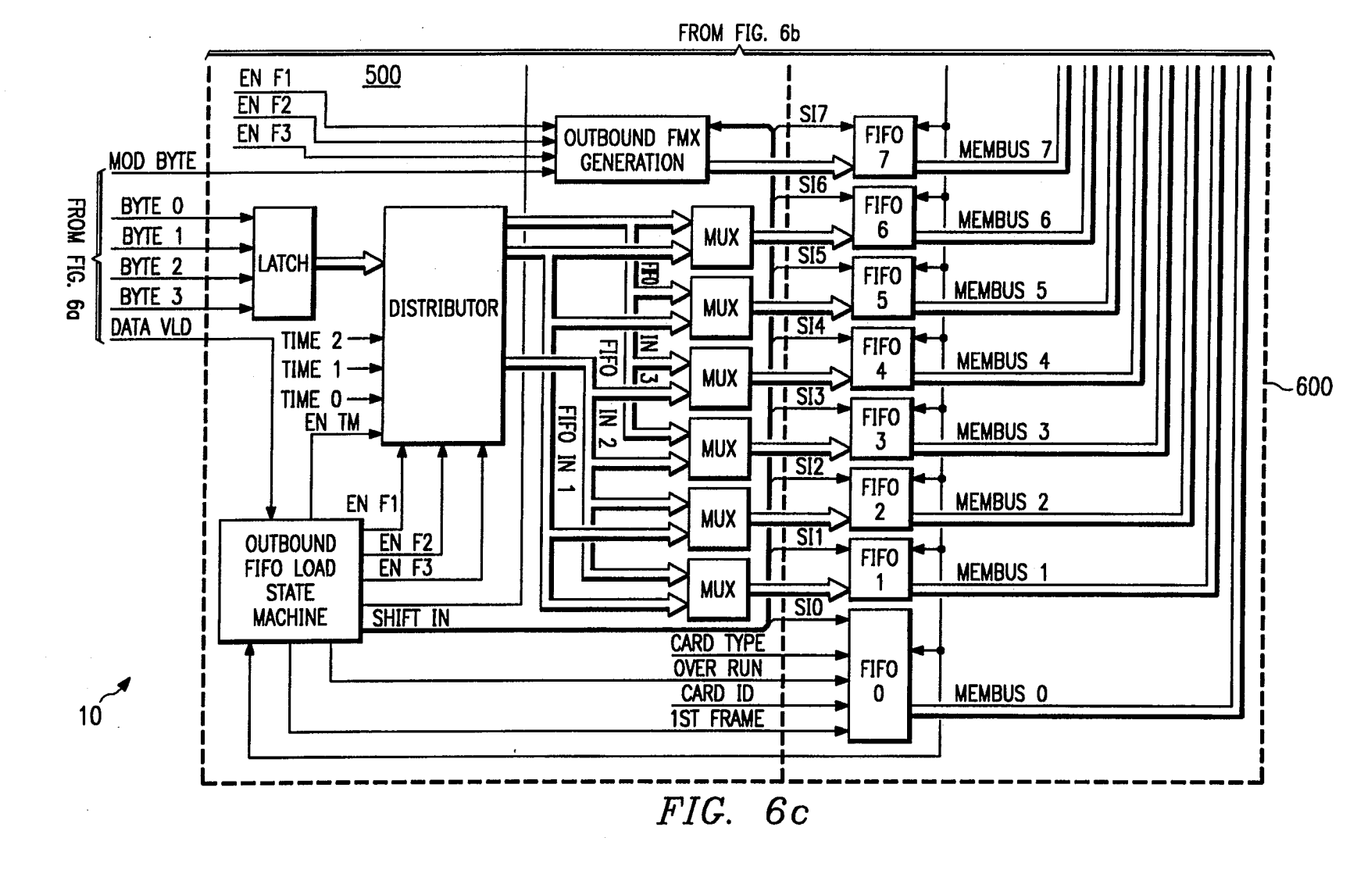

FIG. 6 is a detailed block diagram of one embodiment of the ESCON formatter card 10. Because the formatter card 10 must process ESCON I/O signals travelling in both directions between the host 14 and the peripheral device 16, the input module 300, the trace module 400, the load state machine and MUX array 500 and the temporary storage 600 are each partitioned into an inbound section (generally in the upper portion of FIG. 6a and in FIG. 6b) and an outbound section (generally in the lower portion of FIG. 6a and in FIG. 6b). The inbound and outbound sections of each module are the same; consequently, although specific reference will not be made to the outbound sections, the following description of the inbound sections will also apply to the outbound sections.

The input module 300 serves as the interface between the rest of the formatter card 10 and the optical ESCON channel to which it is attached. It includes inbound converters 302 and 304 to convert light signals from a peripheral device into electrical data signals and electrical data signals into light signals. A retimer 306 is interconnected with both inbound converters 302 and 304 for resynchronizing the interface data with a clock and redriving the data back onto the channel to the host device. Additionally, the retimer 306 outputs the data signals to an inbound deserializer 308 which outputs parallel data signals.

The trace module 400 includes an inbound trace unit 402 having a data input interconnected to the output of the inbound deserializer 308, and control inputs and outputs interconnected with the control module 800. The inbound trace unit 402 further contains logic providing ESCON frame detection, comparison and decoding. Data output terminals of the inbound trace unit 402 provide a trace data word having four data bytes, a modifier byte, and four frame descriptor bits (described above with respect to FIG. 4).

The control module 800 includes an 8-bit microprocessor I/O port interconnecting the control module 800 with the GPT 20. Decode and control logic 802 serves as an interface between the port and a multibus port to which the control input and output terminals of the inbound trace unit 402 are interconnected. The control module 800 also includes address registers 804 and 806 and data registers 808 and 810 interconnected with other terminals of the inbound trace unit 402. Software executed in the GPT 20 controls the inbound trace unit 402 through the decode and control logic 802 by specifying the ESCON frames on which to start and stop tracing operations.

Figure 7:
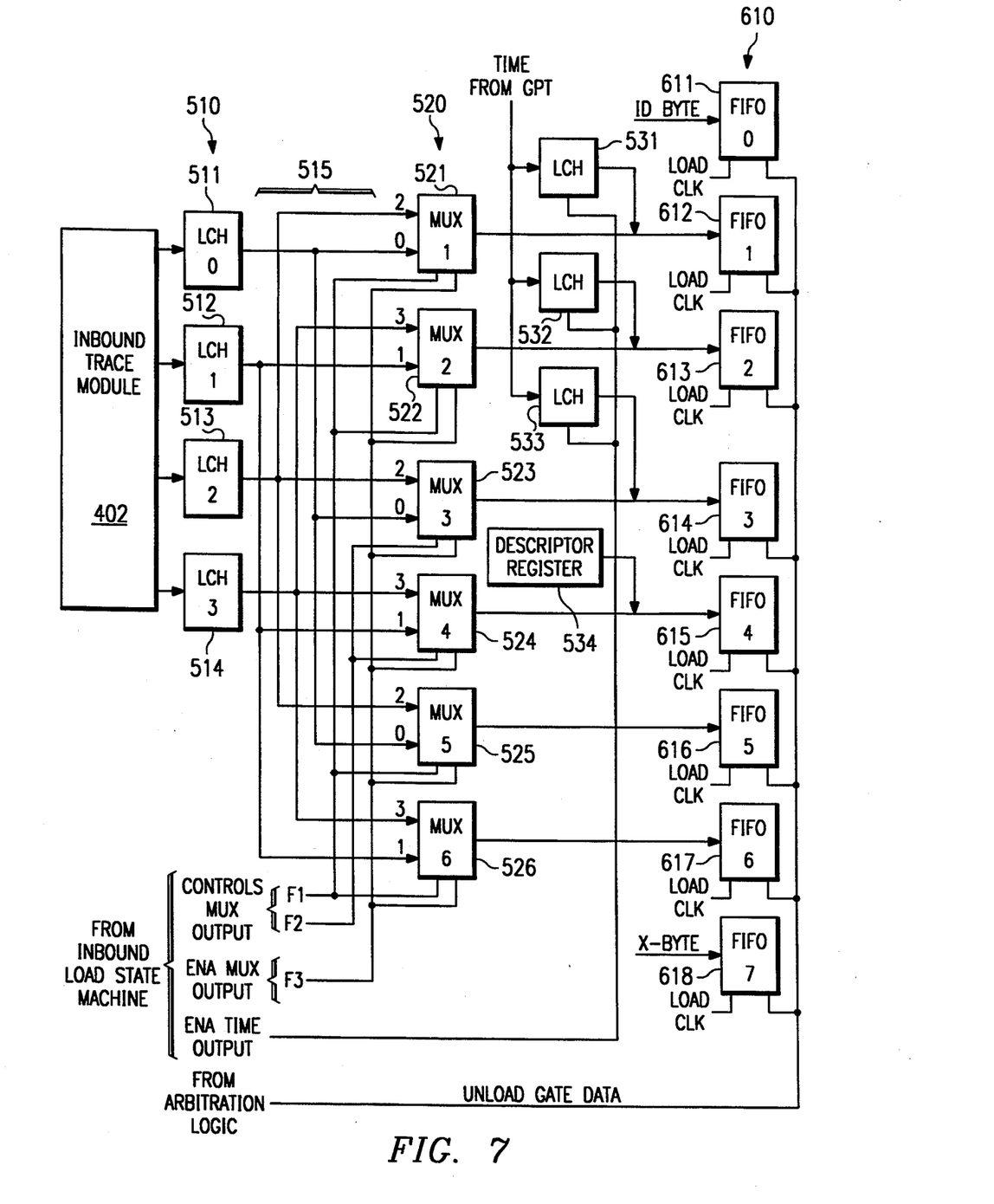
FIG. 7 is a detailed block diagram of configuration of latches, multiplexers and memory devices of the embodiment of the present invention illustrated in FIG. 6.

The inbound load state machine and MUX array 500 comprises an inbound first-in-first-out (FIFO) load state machine 502, a set of data latches 510, an array of MUX's 520 and means 515 for distributing the signals from the latches 510 among the inputs of the MUX's in the array 520. Referring to FIG. 7, the set of latches 510 includes four data latches 511, 512, 513 and 514, each interconnected with one of the four data outputs of the inbound trace unit 402. The array 520 of MUX's includes six MUX's 521-526, each associated with one of the six data bytes of a GPT frame. The identification byte (byte 0 of each frame) is generated by the inbound load state machine 502 and not processed through the MUX array 520. The X byte (byte 7 of each frame) is generated by an inbound FMX generator 530 and is also not processed through the MUX array 520.

Each MUX 521-526 has two data inputs, interconnected through the distribution means 515 with two of the four data latches 511-514, and two select inputs, one interconnected with an enable output of the inbound load state machine 502 and the other interconnected with one of two MUX control outputs of the inbound load state machine 502. The output of each MUX 521-526 is interconnected with a corresponding one of six FIFO memory cells 612-617 in an inbound FIFO memory block 610 of the temporary memory storage 600. Two other memory cells 611 and 618 store the identification byte and the X byte generated by the inbound load state machine 502 and the inbound FMX generator 530, respectively.

The arbitration logic 700 has an input and an output interconnected with the GPT 20 to receive a GATE DATA signal and to transmit a FRAME RDY signal from and to the GPT 20, respectively. Additionally, the arbitration logic 700 has FRM RDY inputs interconnected with the inbound load state machine 502 (and with an outbound load state machine) and GATE DATA outputs interconnected with the inbound memory block 610 (and with an outbound memory block).

Figure 8:
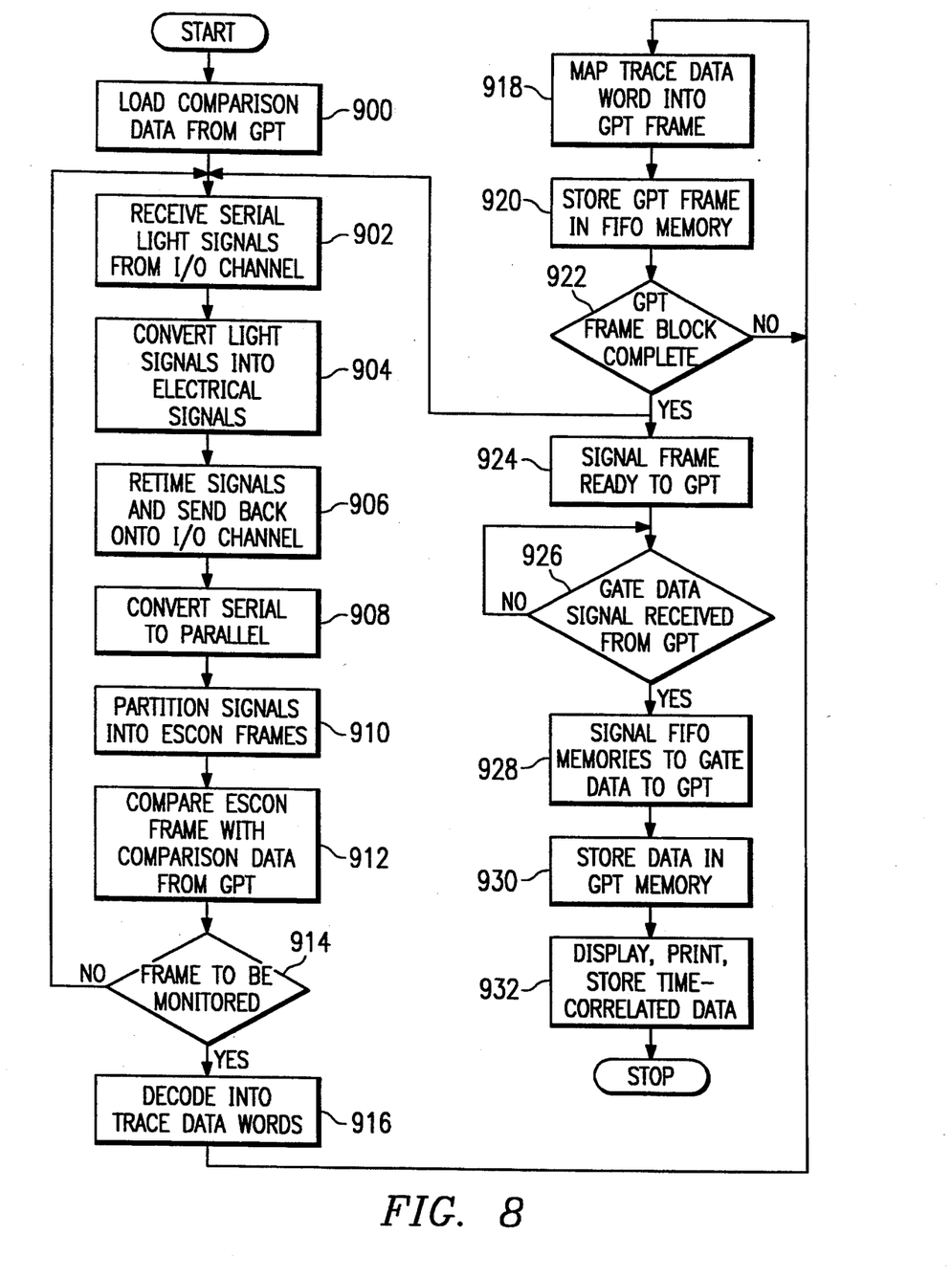
FIG. 8 is a flow chart of one embodiment of the method of the present invention.

The operation of the present invention will now be described with reference to the flow chart of FIG. 8 as well as to the previously discussed block diagrams. The decode and control logic 802, under the control of GPT software, loads appropriate frame comparison and detection data into the inbound trace unit 402 to define which ESCON frames are to be processed and which are not (Step 900). Interface light signals representing ESCON interface frames being transmitted from the peripheral on the channel to which the formatter card 10 is connected are intercepted by the inbound converter 302 of the input module 300 (Step 902) and transmitted as electrical signals to the retimer 306 (Step 904). The retimer 306 resynchronizes the signals and sends them to the other converter 304 which redrives the interface signals back onto the channel to the host (Step 906). The retimer also sends the signals to the inbound deserializer 308 for conversion into parallel data words (Step 908) and transmission to the inbound trace unit 402. The inbound trace unit 402 receives the parallel data (typically 10-bits per word) from the deserializer 308, decodes it and partitions the data into ESCON frames (Step 910). Identification information in each frame is compared with the information provided by the GPT software through the decode and logic 802 (Step 912). If it is not desired to monitor ESCON frames (Step 914), frames are not processed. If, on the other hand, monitoring of signals is to begin, frame comparison and detection data loaded by software through the decode and control logic 802 enables the inbound trace unit 402.

As previously described, the inbound trace unit 402 divides each ESCON frame into a plurality of 44-bit trace data words (Step 916), each having four data bytes, a modifier byte and a 4-bit frame descriptor code (Step 918). The data bytes are latched into the four data latches 511–514. Additionally, three time latches 531, 532 and 533 receive the current time from the GPT 20. Upon a command from the inbound load state machine 502 on lines F1, F2, F3, SHIFT-IN and ENA, the first GPT frame is loaded into the FIFO memory cells 611–618 as follows: the time latches 531–533 are enabled to load the current-time into the second, third and fourth memory cells 612–614. The descriptor byte is loaded into the fifth memory cell 615 from a descriptor byte register 534. Signals on the lines F1, F2 and F3 direct the fifth and sixth MUX's 525 and 526 to select the outputs of the first two data latches 511 and 512, respectively, and send the first two data bytes of the first trace data word to the fifth and sixth memory cells 616 and 617. The ID byte is sent directly into the first memory cell 611 from the inbound load state machine 502 and the X byte is sent directly into the last memory cell 618 from the inbound FMX generator 530. Consequently, the first GPT frame is complete and stored in the inbound FIFO memory block 610 (Step 920).

At a next set of commands (Step 922) from the inbound load state machine 502, the first GPT frame stored in the inbound FIFO memory block 610 is shifted within the FIFO memory cells 611–618 and the second GPT frame is loaded as follows: again, the ID and X bytes are loaded into the first and last cells 611 and 618 (the ID byte having been modified to indicate that the frame is not the first frame in the GPT block). Signals on the lines F1, F2 and F3 direct the first and second MUX's 521 and 522 to select the outputs of the second two data latches 513 and 514, respectively, and send the last two data bytes of the first trace data word to the second and third memory cells 612 and 613. The four data bytes of the second trace data word are then latched into the data latches 511–514. New signals from the inbound load state machine 502 direct the third through sixth MUX's 523–526 to select the outputs of all four of data latches 511 and 512, respectively, and send the all four data bytes of the second trace data word to the fourth through seventh memory cells 614–617. Consequently, the second GPT frame is complete and stored behind the first GPT frame in the inbound FIFO memory block 610.

The third, fourth and fifth trace data words from the inbound trace unit 402 are loaded into the inbound FIFO memory block 610 in a similar fashion, with the inbound load state machine 502 directing each of the MUX's 521–526 to select the appropriate data latch. After all five trace data words have been mapped into the four GPT frames, the inbound FIFO memory block 610 holds a complete ESCON frame in the form of a block of GPT frames. The inbound load state machine 502 sends an INBOUND FRM RDY signal to the arbitration logic 700 which sends a similar signal to the GPT 20 (Step 924). When the GPT 20 is ready to accept the GPT block, it sends a GATE DATA signal to the arbitration logic 700 (Step 926) which, in turn, sends a series of signals to the memory cells 611–618 to gate the four GPT frames onto a data bus interconnected with the GPT 20 (Step 928). The frame is then stored in GPT memory 25 (Step 930) and can be displayed, printed or permanently stored (Step 932).

To increase efficiency of the formatter card 10, the inbound FIFO memory block 610 preferably stores more than four GPT frames at one time, and preferably has sixty-four or more 8-byte rows to hold sixteen or more full ESCON frames. With such a configuration, the formatter card 10 can continue to process and store ESCON interface data while the GPT 20 is receiving and processing data from other ESCON and non-ESCON formatter cards and the GPT is able to interleave the data from the several cards for time-correlated printout, display and/or permanent storage. Such concurrent activity is represented in the flowchart of FIG. 8 by the line between Steps 922 and 902.

While the invention has been particularly shown and described with reference to preferred embodiments thereof, it will be understood by those skilled in the art that various changes in form and details may be made therein without departing from the spirit and scope of the invention.

What is claimed is:

1. An apparatus for monitoring ESCON interface signals, comprising:
    means for receiving serial, optical ESCON interface signals;
    means for converting the interface signals into parallel data electrical signals comprising 10-bit data words;
    means for partitioning the parallel data signals into at least one ESCON frame and for decoding each ESCON frame into a plurality of 44-bit trace data words having first through fourth data bytes, a modifier byte and a four-bit descriptor;
    means for mapping the plurality of trace data words into a block of 64-bit GPT frames capable of being processed by a general purpose trace tool (GPT)

and having first through eight bytes, said means for mapping comprising:
  means for generating a byte identifying a first GPT frame and inserting the identification byte into the first byte of the first GPT frame;
  means for determining the time the ESCON frame was received and inserting the time into the second through fourth bytes of the first GPT frame;
  means for inserting the descriptor byte into the fifth byte of the first GPT frame;
  means for inserting the first two data bytes of the trace data word into the sixth and seventh bytes of the first GPT frame;
  means for generating a byte identifying a second GPT frame and inserting the identification byte into the first byte of the second GPT frame;
  means for inserting the second two data bytes of the trace data word into the second and third bytes of the second GPT frame; and,
  means for inserting the four data bytes of a second trace data word into the fourth through seventh bytes of the second GPT frame; and
  means for displaying the block of GPT frames.

2. The apparatus of claim 1, wherein said means for receiving interface signals comprises means for receiving interface signals from a plurality of ESCON channels.

3. The apparatus of claim 2, wherein said means for displaying the block of GPT frames comprises means for displaying a plurality of GPT blocks from the plurality of ESCON channels in order of receipt by said means for receiving.

4. The apparatus of claim 3, wherein said means for displaying the block of GPT blocks further comprises means for displaying a plurality of GPT blocks from non-ESCON sources.

5. An apparatus for monitoring ESCON interface signals, comprising:
  an input module interconnected to an ESCON channel for converting serial optical interface signals received from the ESCON channel into electrical signals;
  a repeater for retransmitting the serial optical interface signals received from the ESCON channel;
  a deserializer interconnected to said input module for converting the serial interface signals into parallel data signals;
  a trace module interconnected with said deserializer for decoding and partitioning the parallel data signals into a plurality of ESCON frames and generating a first plurality of trace data words, each trace data word having four data bytes;
  a processing module interconnected with said trace module for mapping the first plurality of trace data words into a block of GPT frames, capable of being processed by a general purpose trace tool (GPT), representing one ESCON frame;
  memory means for storing each GPT frame; and
  means interconnected to said memory means for displaying each ESCON frame.

6. The apparatus of claim 5, wherein:
  a first GPT frame of the block comprises the first two data bytes of a first trace module word;
  a second GPT frame of the block comprises the second two data bytes of the first trace module word and the four data bytes of a second trace module word;
  a third GPT frame of the block comprises the four data bytes of a third trace module word and the first two data bytes of a fourth trace module word; and
  a fourth GPT frame of the block comprises the second two data bytes of the fourth trace module word and the four data bytes of a fifth trace module word.

7. The apparatus of claim 5, wherein each GPT frame generated by said processing module comprises eight bytes, a first byte of each GPT frame being an identification byte.

8. The apparatus of claim 7, wherein the first GPT frame of the GPT block comprises a three-byte time stamp following the identification byte.

9. The apparatus of claim 5, further comprising a controller for transmitting a signal to said display means when a complete block of GPT frames has been stored in said memory means.

10. The apparatus of claim 9, wherein said controller comprises means for directing said memory means to transfer the complete block of GPT frames to said display means.

11. An apparatus for monitoring optical, serial interface signals, comprising:
  a control module having control inputs and outputs;
  an arbitration module having a gate data input and a frame ready output interconnected with a general purpose trace device;
  a first inbound optical/electrical interface having an optical input interconnected with at least one optical, serial ESCON channel;
  a retimer module having an input interconnected with an electrical output of said first inbound optical/electrical interface;
  a second inbound optical/electrical interface having an electrical input interconnected with a first output of said retimer module and an optical output interconnected with at least one ESCON channel;
  an inbound deserializer having an input interconnected with a second output of said retimer module;
  an inbound trace module having a data input interconnected with an output of said inbound deserializer and further having of control inputs and outputs interconnected with said control inputs and outputs of said control module;
  an inbound load state device having control inputs interconnected with control outputs of said arbitration module and of said inbound trace module and further having select outputs;
  a plurality of inbound multiplexers, each having select inputs interconnected with said select outputs of said inbound load state device, data inputs interconnected with data outputs of said inbound trace module, and a data output;
  a plurality of inbound memory devices, each having a data input interconnected with said data output of one of said inbound multiplexers, a control input interconnected with a control output of said arbitration module, and a control input interconnected with a control output of said inbound load state device;
  a first outbound optical/electrical interface having an optical input interconnected with the at least one ESCON channel an electrical output interconnected with an input of said retimer module;

a second outbound optical/electrical interface having an electrical input interconnected with a third output of said retimer module and an optical output interconnected with the at least one ESCON channel;

an outbound deserializer having an input interconnected with a fourth output of said retimer module;

an outbound trace module having a data input interconnected with an output of said outbound deserializer and further having of control inputs and outputs interconnected with said control inputs and outputs of said control module;

an outbound load state device having control inputs interconnected with said control outputs of said arbitration module and of said outbound trace module and further having select outputs;

a plurality of outbound multiplexers, each having select inputs interconnected with said select outputs of said outbound load state device, data inputs interconnected with data outputs of said outbound trace module, and a data output; and a plurality of outbound memory devices, each having a data input interconnected with said data output of one of said outbound multiplexers, a control input interconnected with a control output of said arbitration module, and a control input interconnected with a control output of said outbound load state device.

* * * * *